United States Patent Office 3,104,240
Patented Sept. 17, 1963

3,104,240
MANNICH BASES OF TETRACYCLINE
ANTIBIOTICS
Lee C. Cheney, Fayetteville, and William C. Risser and William J. Gottstein, Syracuse, N.Y., assignors, by mesne assignments, to Bristol-Myers Company, New York, N.Y., a corporation of Delaware
No Drawing. Filed Aug. 18, 1958, Ser. No. 755,411
11 Claims. (Cl. 260—247.2)

This invention relates to new and useful chemical intermediates and antibacterial agents which are derivatives of the tetracycline antibiotics and, more particularly, to Mannich bases of the tetracycline antibiotics.

This application is a continuation-in-part of our prior, co-pending application Serial Number 684,639, filed September 18, 1957, and now abandoned, which was in turn a continuation-in-part of our prior, copending applications Serial Numbers 520,158, 520,159 and 520,160, all filed July 5, 1955, and now abandoned, which were in turn continuations-in-part of our prior, co-pending applications Serial Numbers 477,903, 447,901 and 447,902 respectively, all filed August 4, 1954, and now abandoned.

The tetracycline antibiotics include tetracycline, chlortetracycline, oxytetracycline and bromotetracycline. Because all are useful in the present invention and are substantially equivalent, the present invention will be described for illustrative purposes primarily in terms of tetracycline itself but it will be understood that the same teachings are applicable to all four tetracycline antibiotics. Tetracycline itself is the most useful; tetracycline, chlortetracycline and oxytetracycline form a preferred subgroup because of their ready availability and demonstrated clinical utility.

It is an object of the present invention to provide derivatives of the tetracycline antibiotics having improved utility, that is, being less toxic, more stable, more effective, more easily absorbed on oral administration, more easily administered by intravenous or intramuscular injection or more soluble in water or body fluids.

In the past it has proven substantially impossible to prepare highly antibacterial derivatives of tetracycline because of the large number of reactive centers in this molecule. Thus many reagents remove water from ring C to make it aromatic; this produces an anhydrotetracycline which has only minor antibacterial activity. Attempts to acylate the alcohol or phenolic hydroxyl groups in the molecule have simultaneously removed water from the carboxamido group to give inactive nitriles which could not be hydrated back to carboxamides. Removal of the dimethylamino group has given inactive compounds. Attempts to alkylate tetracycline have resulted in aromatization of ring C and substitution on the carboxamido group. Certain esters of tetracycline antibiotics are disclosed in Canadian Patent 516,567 and French Patent 1,098,947. It is therefore a further object of the present invention to provide as chemical intermediates compounds which can be converted into antibacterially active derivatives of the tetracycline antibiotics containing the original dimethylamino group and preferably also the original carboxamido group.

The objectives of the present invention have been achieved and there is now provided by the present invention a compound selected from the group consisting of Mannich bases of the tetracycline antibiotics and acid addition salts thereof.

In particular there is provided by the present invention a compound selected from the group consisting of basic compounds having the formula

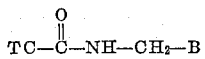

wherein TC represents all except the carboxamido group of a member selected from the group consisting of tetracycline, oxytetracycline, chlortetracycline and bromotetracycline and B represents a secondary amino group; and acid addition salts thereof. These compounds in the form of their free bases are also represented by the formula

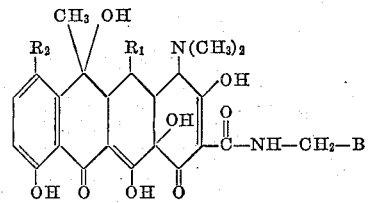

wherein $R_1$ is hydrogen or hydroxyl, $R_2$ is hydrogen, chloro or bromo and at least one of $R_1$ and $R_2$ is hydrogen and B is a secondary amino group.

There is further provided as a particular embodiment of the present invention a compound selected from the group consisting of basic compounds having the formula

wherein TC represents all except the carboxamido group of a member selected from the group consisting of tetracycline, oxytetracycline, chlortetracycline and bromotetracycline and B represents a secondary amino group, said secondary amino group containing, in addition to the nitrogen atom of the secondary amino group, no elements other than carbon, hydrogen and oxygen bound in ethereal linkage; and acid addition salts thereof.

There is also provided as a particularly closely-related series of compounds within the bounds of the present invention a compound selected from the group consisting of basic compounds having the formula $$TC-\overset{O}{\underset{\|}{C}}-NH-CH_2-B$$

wherein TC represents all except the carboxamido group of a member selected from the group consisting of tetracycline, oxytetracycline, chlortetracycline and bromotetracycline and B represents a member selected from the group consisting of di(lower)alkylamino, pyrrolidino, piperidino, morpholino, 2,6-dimethylmorpholino, N'-(lower)-alkylpiperazino, pipecolino and dibenzylamino; and acid addition salts thereof.

These compounds are herein called Mannich bases of the tetracycline antibiotics.

These Mannich bases are prepared in general according to the procedures given in the procedures below or those given by Chapter 10, the Mannich Reaction, Organic Reactions, volume 1, pages 303–341, published in 1942 by Wiley and Sons, New York, and the references therein. Thus about one mole of a secondary amine, such as dimethylamine, diethylamine, diethanolamine, dipropylamine, di-n-butylamine, diisoamylamine, dibenzylamine, methyldiethylenediamine, methylaniline, piperidine, α-, β-, and γ-pipecoline, 1,2,3,4-tetrahydroisoquinoline, 6-methoxy-1,2,3,4-tetrahydroisoquinoline, morpholine, 2,6-dimethylmorpholine, N'-methylpiperazine, N-methylbenzylamine, pyrrolidine, di(beta-methallyl)amine, diallylamine, N-ethylallylamine, 2,6-dimethylpiperidine, N-methyl-n-butylamine, N-methylglucamine, diethanolamine, N-cyclohexyl-cyclohexylamine, N-ethylcyclohexylamine, N-methyl-3-picolylamine ($C_5H_4N-CH_2-NH-CH_3$), N-methyl-2-picolylamine, 1,2,5,6-tetrahydropyridine, β,β'-dichlorodiethylamine, or N-methyl-dehydroabietylamine, is reacted with at least one mole of formaldehyde or a polymer thereof and about one mole of tetracycline.

As is apparent, the presence of additional functional groups will interfere with the later use of some hydrogen-replacing reagents but not of others; selection of the proper reagent in a given case is then made according to the reactivities apparent from the structure or on the basis of simple test. One preferred group of amines to be used consists of secondary amines which do not contain any reactive or functional group other than the amino group; thus a preferred subgroup of secondary amines comprises those which contain only the elements carbon and hydrogen in addition to the nitrogen. An additional ethereal oxygen or tertiary amino group may be present without harm. The reaction is conveniently carried out by heating the reagents in absolute alcohol in the steam bath for several hours in an atmosphere of nitrogen. The product is isolated by cooling and collecting by filtration, by lyophilizing the solution, or by precipitating the product by the addition of another organic solvent such as ether.

These Mannich bases, the substituted Mannich bases made from them and the substituted tetracyclines made from the latter include the free bases and the organic and inorganic acid addition salts prepared by simple addition of one equivalent of acid to the base. These salts include those prepared from acids such as hydrochloric, sulfuric, sulfamic, tartaric, hydrobromic, hydriodic, glycolic, citric, maleic, phosphoric, succinic, acetic, ascorbic and the like. The free bases are prepared from the acid addition salts by the addition of one equivalent of alkali, e.g., sodium hydroxide, to a solution of the latter. Salts of other toxic acids are also useful for processing and as chemical intermediates, e.g. picrates, picrolonates, formates.

Many of the acid addition salts of these compounds exhibit high and very useful solubility in water.

In addition, as will be set forth in greater detail below, the Mannich bases and their acid addition salts of the present invention are useful intermediates for the preparation of substituted tetracycline antibiotics in which the dimethylamino group and preferably the carboxamido group are unaltered.

Additional information is given by the following examples which are for purposes of illustration only and not of limitation.

EXAMPLE 1

One gram (.00225 mole) of tetracycline base (anhydrous), 0.101 g. (.00338 mole) paraformaldehyde and 0.578 g. (.00248 mole) of dibenzylamine hydrochloride are heated to reflux in 25 ml. absolute ethanol on the steam bath under an atmosphere of nitrogen. After two hours, more paraformaldehyde (0.10 g.) is added and heating is continued for two more hours. The solution is acidified with 5 drops of concentrated hydrochloride acid and refluxed for ten more minutes. The desired product N'-dibenzylamino-methyltetracycline hydrochloride forms and is isolated as a crystalline, antibacterially active solid differing in specific rotation from tetracycline hydrochloride. The product is converted to the free base by solution in water followed by the addition of one equivalent of sodium hydroxide. Thus, for isolation the alcoholic solution of N'dibenzylamino-methyl-tetracycline hydrochloride is filtered and diluted with two volumes of ether to precipitate the product, which is recrystallized from warm n-butanol, dried at 60° C. in vacuo over $P_2O_5$ and found to melt over a range, decomposing slowly from 190°–200° C. with bubbles.

Analysis.—Calc'd. for $C_{37}H_{40}N_3O_8 \cdot HCl$: C, 64.3; H, 5.96. Found: C, 65.0; H, 5.90.

The product, N'-dibenzylaminomethyl-tetracycline hydrochloride, assays 130–173 tetracycline mcg./mgm. by bio-assay versus B. subtilis (theory 693) and exhibited $[\alpha]_D^{22°}$—95.0° in methanal. Tetracycline under the same conditions has $[\alpha]_D^{22°}$—261.7°. The product is soluble in water at room temperature to the extent of about 175 mgm./ml.

EXAMPLE 2

One gram (0.00225 mole) of anhydrous tetracycline base, 0.101 g. (0.0025 mole) of paraformaldehyde and 0.204 g. (0.0025 mole) of dimethylamine hydrochloride are refluxed for three hours in 25 ml. of absolute ethanol. The desired product, N'-dimethylaminomethyl-tetracycline hydrochloride forms and is isolated as a crystalline, antibacterially active solid differing in specific rotation from tetracycline hydrochloride. The product is converted to the free base by solution in water followed by the addition of one equivalent of sodium hydroxide. Thus, for isolation the alcoholic solution of the product is cooled, filtered, and the filtrate diluted with ether to precipitate N'-dimethylaminomethyl-tetracycline hydrochloride which is collected by filtration and dried in vacuo over $P_2O_5$.

After recrystallization from hot butanol, the product assays 495–594 tetracycline mcg./mgm.

EXAMPLE 3

One gram (0.00225 mole) of anhydrous tetracycline base, 0.101 g. (0.0038 mole) of paraformaldehyde and 0.302 g. (0.0025 mole) piperidine hydrochloride are refluxed in 25 ml. absolute ethanol. After two hours an additional 0.101 g. paraformaldehyde is added and refluxing is continued for two more hours. The solution is then cooled and two drops of concentrated hydrochloric acid are added. The product, N'-(1-piperidylmethyl)-tetracycline hydrochloride, forms and is isolated as a crystalline, antibacterially active solid differing in specific rotation from tetracycline hydrochloride. The product is converted to the free base by solution in water followed by the addition of one equivalent of sodium hydroxide. Thus for isolation, the alcoholic solution of N'-(1-piperidylmethyl)-tetracycline hydrochloride is diluted with 5.0 ml. ether to precipitate the product, which is collected by filtration and dried in vacuo over $P_2O_5$, weight 0.81 g., bioassaying 295–310 tetracycline mcg./mgm. versus B. subtilis $[\alpha]_D^{22°}$—130.5° (c.=4.0 in 0.1 N hydrochloric acid) and soluble in water at room temperature to the extent of somewhat less than 100 mgm./25 ml.

EXAMPLE 4

One gram (0.00225 mole) of anhydrous tetracycline base, 0.101 g. (0.0025 mole) of paraformaldehyde and 0.308 g. (0.0025 mole) morpholine hydrochloride are refluxed for four hours in 25 ml. absolute ethanol, with intermediate addition of an additional 0.101 g. paraformaldehyde. Finally, two drops of concentrated hydrochloric acid are added and the reaction mixture is cooled. The desired product, N'(4-morpholinylmethyl) tetracycline hydrochloride, forms and is isolated as a crystalline, antibacterially active solid differing in specific rotation from tetracycline hydrochloride. The product is converted to the free base by solution in water followed by the addition of one equivalent of alkali.

EXAMPLE 5

One gram (0.00225 mole) of anhydrous tetracryline base, 0.182 g. (0.00225 mole) 37% aqueous formaldehyde, 0.101 g. (0.00225 mole) morpholine and 25 ml. ethanol is mixed and refluxed for three hours on a steam bath. After removal of the solvent by distillation in vacuo, the residual product is diluted with a lower hydrocarbon (Skellysolve A) to precipitate solid, antibacterially active product N'-(4-morpholinylmethyl) tetracycline which is collected by filtration. The product is converted to an acid addition salt, e.g., hydrochloric, by solution in water followed by the addition of one equivalent of acid.

The solid N'-(4-morpholinylmethyl) tetracycline, weight 0.85 g., bioassays about 600 tetracycline mcg./mgm., is soluble in water to the extent of 100 mgm./ml., and exhibits $[\alpha]_D^{24°}$=—193.0° in 0.1 N hydorchloric acid (c.=0.1).

Analysis.—Cal'd. for $C_{27}H_{35}N_3O_9$: C, 59.5; H, 6.48; N, 7.71. Found: C, 59.6; H, 6.30; N, 8.01.

EXAMPLE 6

Three hundred and seventy grams of vacuum-dried, recrystallized tetracycline (containing no more than five percent water) is slurried in four liters of tertiary butyl alcohol in a large flask equipped with a mechanical stirrer and a reflux condenser. To this stirred mixture is added 79.5 grams morpholine (distilled, B.P. 124°–128° C. at 745 mm.) and 73.0 grams formalin. The mixture is stirred in the cold for thirty minutes and then heated as quickly as possible to boiling and refluxed for a period of fifteen minutes. The solution is filtered while hot to remove all insoluble material, preferably in a heated filter, and the filtrate is cooled without delay to room temperature (25° C.). The precipitate is collected by filtration, washed with 300 ml. tertiary butyl alcohol and air-dried to constant weight to give 415 grams of amorphous N'-(4-morpholinylmethyl) tetracycline, containing about 5.5% volatile solvent, having a potency by bioassay of about 628 mcg./mgm. using tetracycline as standard (theory is 884 mcg./mgm.), melting in the range of 135°–150° C. and exhibiting $[\alpha]_D^{23°}$ in the range —200° to 208° (c.=1 in water).

Various samples were analyzed. *Analysis.*—Calc'd. for $C_{27}H_{33}N_3O_9$: C, 59.66; H, 6.12. Found: C, 59.6, 59.8, 59.8, 60.3, 60.0, 60.8; H, 6.30, 6.64, 6.86, 6.38, 6.25, 6.86.

The infra-red spectrum of N'-(morpholinylmethyl) tetracycline exhibits at 1525 cm.$^{-1}$ a substituted amide absorption band, not seen in tetracycline itself, and also an absorption peak at 1115 cm.$^{-1}$ which is interpreted as an ether band due to the morpholine.

EXAMPLE 7

Usuing equivalent quantities in the procedure of Example 6, 2,6-dimethylmorpholine was reacted with formaldehyde and tetracycline to give the water-soluble derivative N' - (4 - [2,6-dimethyl-morpholinyl]methyl)tetracycline, having $[\alpha]_D^{26°}$ —216° (c.=0.5 in water). Corresponding water-soluble products were prepared using equivalent amounts of diethylamine, N-methyl-taurine and dimethylamine in place of morpholine of Example 6.

EXAMPLE 8

N'-(pyrrolidylmethyl)tetracycline was prepared, using pyrrolidine in the above procedures, and found to be a crystaline solid melting at about 158°–165° C. with decomposition.

*Analysis.*—Calc'd. for $C_{27}H_{33}N_3O_8$: C, 61.5; H, 6.31; N, 7.97. Found: C, 60.9; H, 6.88; N, 6.95.

EXAMPLE 9

One gram (0.00208 mole) of anhydrous chlortetracycline base is suspended in 100 ml. absolute ethanol with 0.487 g. (0.00208 mole) dibenzylamine hydrochloride and 0.101 g. paraformaldehyde and refluxed for 4½ hours. After removal of the solvent by distillation in vacuo, a lower hydrocarbon (Skellysolve A) is slurried with the residue and the solid, antibacterially active product, N'-dibenzylaminomethylchlortetracycline hydrochloride, is collected by filtration and air-dried, weight 1.3 g.. The product is soluble in water to the extent of 100 mgm./3 ml., bioassays 1150 tetracycline mcg./mgm. versus *B. subtilis*, exhibits $[\alpha]_D^{24°}$=—127.5° in methanol (c.=0.4) and is analyzed.

*Analysis.*—Calc'd. for $C_{37}H_{38}N_3O_8Cl \cdot HCl$: C, 60.6; H, 5.52. Found: C, 58.8; H, 5.72, moisture, 2.58.

EXAMPLE 10

Chlortetracycline base (2.52 g., 0.005 mole, 5.4 percent water) was suspended in 100 ml. tertiary butanol at 25.5° C. and there was added 0.48 g. morpholine (0.0055 mole) and 0.39 g. (0.005 mole) aqueous 37% formaldehyde. The solution was heated to reflux for fifteen minutes and cooled to precipitate N'-(4-morpholinylmethyl) chlortetracycline, which was collected by filtration, washed with 20 ml. cold t-butanol and dried in vacuo at 60° C. giving 2.8 grams.

*Analysis.*—Calc'd. for $C_{27}H_{32}N_3O_9Cl$: C, 56.2; H, 5.59; N, 7.28. Found: C, 56.2; H, 6.25; N, 6.39.

The chlortetracycline reagent used bioassayed 515–596 chlortetracycline mcg./mgm. and the product bioassayed 230–253 chlortetracycline mcg./mgm., was completely water-soluble and exhibited in its infra-red absorption spectrum a substituted amide band at 1525 cm.$^{-1}$.

EXAMPLE 11

One gram (.00202 mole) oxytetracycline hydrochloride, 0.398 g. (0.00202 mole) dibenzylamine and 0.101 g. paraformaldehyde are refluxed together in 50 ml. ethanol for four hours. After cooling and filtering, the solution is diluted with three volumes of ether to precipitate the product N'-dibendylaminomethyloxytetracycline hydrochloride. The precipitate is collected by filtration, slurried with a hydrocarbon (Skellysolve A) and again collected by filtration, and found to melt at about 185°–190° C. with decomposition, to be soluble in water to the extent of less than 100 mgm./25 ml., to have $[\alpha]_D^{24°}$=—90.6° in methanol (c.=0.4) and to bioassay 144 chlortetracycline mcg./mgm.

*Analysis.*—Calc'd. for $C_{36}H_{39}N_3O_9 \cdot HCl$: C, 62.3; H, 5.82. Found: C, 59.3, 58.3; H, 5.57, 5.75; moisture, 5.48.

EXAMPLE 12

Oxytetracycline base (2.46 g., 0.005 mole, 5.48% water) was slurried in 100 ml. tertiary butanol at 25° C. and there was added 0.48 g. (0.0055 mole) morpholine and 0.39 g. (0.0055 mole) aqueous 37% formaldehyde with stirring. The mixture was heated to reflux for fifteen minutes, filtered hot and the filtrate was cooled to precipitate N'-(4-morpholinylmethyl)oxytetracycline which was collected by filtration, dried in vacuo, found to weigh 1.2 g. and analyzed.

*Analysis.*—Calc'd. for $C_{27}H_{33}N_3O_{10}$: C, 57.95; H, 5.94; N, 7.51. Found: C, 57.4; H, 6.46; N, 7.19.

The product bioassayed 122–135 tetracycline mcg./mgm. and exhibited in its infra-red absorption spectrum a substituted amide band at 1525 cm.$^{-1}$.

EXAMPLE 13

Into a suspension of 37.0 g. (0.083 mole) of anhydrous tetracycline (U.S.P.) in 400 ml. of tert-butyl alcohol was added 8.0 g. (0.091 mole) of freshly-distilled morpholine (Carbide and Carbon Chemicals Corp.) and 7.3 g. (0.090 mole) of formalin (37% formaldehyde) (Mallinckrodt). The mixture was stirred at room temperature for 30 minutes and then heated to boiling (steam bath) and maintained at this temperature for 15 minutes. The hot solution was filtered by gravity for the removal of a small amount of insoluble material and then cooled promptly to 30° C. The pale yellow amorphous solid was collected by filtration, washed with 35 ml. of tert-butyl alcohol and air dried overnight to obtain 41.5 g. (88% yield) of N'-(morpholinomethyl)tetracycline, decomposing over the range 148–154° C. (after starting to darken at 135° C. when placed in a bath preheated to 120° C. and heated at a rate of 2° C. per minute); water content by the Karl Fischer method, 4.26°. A sample of the amorphous product was dried for 3 hours at 110° C. in vacuo over phosphorus pentoxide: $[\alpha]_D^{24°}$ —204.3° (c.=1, water).

*Analysis.*—Calc'd. for $C_{27}H_{33}N_3O_9$: C, 59.67; H, 6.13; N, 7.74. Found: C, 59.9; H, 6.25; N, 7.67.

This zwitterion is extremely soluble in water; the pH of a 1% solution is 6.8. The compound has a biological activity of 590 mcg./mg. as determined by the official Food and Drug Administration turbidimetric assay method for tetracycline wherein tetracycline hydrochloride=1,000 mcg./mgm.

EXAMPLE 14

The procedure given above for N'-(morpholinomethyl)tetracycline was used starting with 37 g. (0.083 mole) of tetracycline, 7.3 g. (0.090 mole) of formalin and 16.5 g. (0.084 mole) of dibenzylamine. The weight of N'-(dibenzylaminomethyl)tetracycline obtained was 34.5 g.; M.P. 90–95° C. (dec.). For analysis the sample was dried in vacuo at 80° C. over phosphorus pentoxide for 2 hours.

*Analysis.*—Calc'd. for $C_{37}H_{39}N_3O_8$: C, 67.98; H, 6.01; N, 6.32. Found: C, 68.1; H, 6.29; N, 6.34.

The biological activity was found to be 500 mcg./mg.

EXAMPLE 15

To 37.0 g. (0.083 mole) pulverized tetracycline suspended in 400 ml. t-butyl alcohol there was added 9.0 g. (0.090 mole) N-methyl-piperazine and 7.3 g. (0.090 mole) formaldehyde. The suspension was heated to boiling and filtered to remove undissolved material. The filtrate was then cooled, precipitating N'-(N-methylpiperazinylmethyl)-tetracycline which was collected by filtration, dried over $P_2O_5$ and found to weigh 10.1 g. and to melt at 149°–157° C. with decomposition and to dissolve in water, forming a solution basic to litmus paper.

Additional Mannich bases of tetracycline with secondary amines are given in Table I below with details of their preparation in Table II.

Table I
N'-AMINOMETHYLTETRACYCLINE DERIVATIVES

| Cpd. No. | Name of Compound | M.P., °C. | Yield, percent | $[\alpha]_D^{20}$ 1% in HCl, degrees | Bioassay, mcg./mgm. |
|---|---|---|---|---|---|
| 9 | N'-(3-Methylpiperidino)methyltetracycline | 164–171 | 72 | −160 | 748 |
| 14 | N'-Diallylaminomethyltetracycline | 104–108 | 40 | −185 | 680 |
| 15 | N'-(N-Allylethylamino)methyltetracycline | 122–125 | 71 | −150 | 652 |
| 16 | N'-2,6-Dimethylpiperidinomethyltetracycline | 176–180 | 90 | 1 −160 | 492 |
| 17 | N'-4-Methylpiperidinomethyltetracycline | 165–172 | 91 | −160 | 592 |
| 18 | N'-(N-n-Butylmethylamino)methyltetracycline | 133–136 | 84 | −190 | 620 |
| 19 | N'-(N-Methylglucamino)methyltetracycline | 145–152 | 99 | −175 | 332 |
| 20 | N'-Dimethylaminomethyltetracycline | Dec. from 157° | 93 | 1 −200 | 880 |
| 25 | N'-Diethanolaminomethyltetracycline | Dec. from 85° | 91 | −165 | 400 |
| 26 | N'-Biscyclohexylaminomethyltetracycline | Dec. from 110° | 79 | −125 | |
| 28 | N'-Ethylcyclohexylaminomethyltetracycline | 145–150 | 74 | −165 | 530 |
| 29 | N'-3-Picolylmethylaminomethyltetracycline | 145–150 | 92 | −185 | 615 |
| 30 | N'-(1,2,3,4-Tetrahydro-2-isoquinolyl)methyltetracycline | 150–153 | 83 | −160 | 575 |
| 37 | N'-2-Picolylmethylaminomethyltetracycline | 142–147 | 83 | −180 | 620 |
| 45 | N'-1,2,5,6-Tetrahydropyridylmethyltetracycline | 157–160 | 91.3 | −168 | 650 |
| 59 | N'-($\beta,\beta'$-Dichlorodiethylaminomethyl)tetracycline hydrochloride | 131–137 | 100 | −152 | 325 |

1 1% in water.

Table II
EXPERIMENTAL DATA

| Cpd. No. | Tetracycline, g. | Amine | g. | HCHO | g. | Solvent | cc. | Procedure | Diluent | cc. |
|---|---|---|---|---|---|---|---|---|---|---|
| 9 | 67.2 | 3-Methyl-piperidine | 17.9 | e | 15.2 | $CH_2Cl_2$ | 290 | a | Pet. ether | 800 |
| 14 | 67.2 | Diallylamine | 17.45 | e | 15.2 | $CH_2Cl_2$ | 290 | a | do | 800 |
| 15 | 67.2 | N-Ethylallylamine | 15.3 | e | 15.2 | $CH_2Cl_2$ | 290 | a | do | 800 |
| 16 | 33.6 | 2,6-Dimethyl-piperidine | 10.0 | f | 8.9 | $CH_2Cl_2$ | 150 | a | Ethyl ether | 800 |
| 17 | 67.2 | 4-Methyl-piperidine | 17.9 | e | 15.2 | $CH_2Cl_2$ | 290 | a | Pet. ether | 800 |
| 18 | 67.2 | N-Methyl-n-butylamine | 14.0 | e | 15.2 | $CH_2Cl_2$ | 290 | a | do | 800 |
| 19 | 44.4 | N-Methyl-glucamine | 23.2 | d | 8.2 | t-Butanol | 225 | b | None | |
| 20 | 34.2 | Dimethylamine (25% sol'n) | 16.3 | d | 5.85 | $CH_2Cl_2$ | 145 | a | do | |
| 25 | 67.2 | Diethanolamine | 18.9 | e | 15.2 | $CH_2Cl_2$ | 290 | a | do | |
| 26 | 67.2 | Dicyclohexylamine | 32.6 | e | 15.2 | $CH_2Cl_2$ | 290 | a | Pet. ether | 800 |
| 28 | 44.4 | Ethylcyclohexylamine | 15.3 | d | 8.5 | $CH_2Cl_2$ | 300 | b | Ethyl ether | 400 |
| 29 | 44.4 | 3-Picolyl-methylamine | 14.7 | d | 8.5 | $CH_2Cl_2$ | 300 | b | do | 400 |
| 30 | 44.4 | 1,2,3,4-tetrahydro-iso-quinoline | 16.0 | d | 8.5 | $CH_2Cl_2$ | 300 | b | do | 400 |
| 37 | 44.4 | 2-Picolyl-methylamine | 13.8 | d | 8.5 | $CH_2Cl_2$ | 300 | b | Pet. ether | 900 |
| 45 | 44.4 | 1,2,5,6-tetrahydro-pyridine | 10.0 | d | 8.2 | $CH_2Cl_2$ | 350 | b | Ethyl ether | 600 |
| 59 | 66.7 | $\beta,\beta'$-dichloro-diethylamine hydrochloride | 32.0 | d | 12.3 | t-Butanol | 600 | b | Pet. ether | 200 |

Procedure *a*: Amine, solvent and formaldehyde are mixed at 0°, stirred for 15 minutes, and 30 g. anhydrous $Na_2SO_4$ added. Stirring is continued for one hour, the mixture is filtered and the salt washed with 25 ml. solvent. The tetracycline is added to the filtrate, and the mixture is stirred for 30 minutes. The solution is diluted with the precipitating solvent, allowed to stand for a few hours, and filtered with suction. The product is washed on the filter with the diluent, and dried.

Procedure *b*: The amine, Methyl Formcel (celanese; a solution of formaldehyde in methanol; contains about 10% water), tetracycline and solvent are refluxed with stirring for one hour.

Procedure *c*: The tetracycline, formaldehyde and methylene chloride are mixed, and the amine is added dropwise to the stirred mixture at room temperature.

Source of Formaldehyde: *d*—55% Methyl Formcel; *e*—46.5% Methyl Formcel; *f*—37% formalin.

With respect to the use of the compounds of the present invention as chemical intermediates, the general procedure comprises the process of reacting a compound having the formula

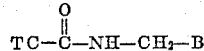

wherein TC represents all except the carboxamido group of a member selected from the group consisting of tetracycline, oxytetracycline, chlortetracycline and bromotetracycline and B represents a secondary amino group, with at least one equivalent of a hydrogen-replacing reagent selected from the group consisting of acid halides such as benzoyl chloride and alkyl haloformates such as ethyl chloroformate, said hydrogen being activated by its location on an atom selected from the group consisting of carbon in a phenolic ring and oxygen, to produce a substituted N'-(secondary-aminomethyl)-tetracycline. If desired, the N'-secondary-aminomethyl group may then be replaced with a hydrogen atom to produce a substituted tetracycline, i.e. by catalytic hydrogenation or by reaction in solution with a formaldehyde-absorbing reagent such as bisulfite ions. These conversions will be illustrated by specific procedures in terms of tetracycline but it will be understood that the same teachings are applicable to all four tetracycline antibiotics.

PROCEDURE 1

*p-Toluenesulfonyl-N'(Morpholinomethyl)-Tetracycline and p-Toluenesulfonyl-Tetracycline* p-Toluenesulfonyl chloride (18 g., 0.095 mole) was added over 30 minutes to a solution of 14.8 g. (0.0268 mole) N'-(morpholinomethyl)tetracycline kept below 0° C. by an ice-salt-acetone bath. After stirring for an additional thirty minutes, the solution was filtered to remove insoluble material present and the filtrate was diluted with 200 ml. t-butyl alcohol, precipitating p-toluenesulfonyl-N'-(morpholinomethyl)tetracycline which was collected by filtration and washed with 100 ml. t-butyl alcohol; yield 18.2 g.

Nine grams of this ester in 50 ml. methanol was hydrogenated (one hour, room temperature, 50 lbs. pressure) in the presence of washed Raney nickel; uptake about 0.75 lb., theory 1.13 lbs. After removal of the catalyst by filtration, distillation of the solvent in vacuo on the steam bath left as the residue the product, p-toluenesulfonyl-tetracycline, as a dark brown oil which was insoluble in water. The oil was solidified by adding methanol (25 ml.) and then t-butyl alcohol (150 ml.) and collected by filtration; yield 5.2 g. This product was soluble in water adjusted to pH 2 with dilute hydrochloric acid (thus forming p-toluenesulfonyl-tetracycline hydrochloride) but was insoluble in water at pH 6. The product was then ground in a mortar, slurried in 100 ml. t-butyl alcohol, recovered and found on heating to begin to darken at 170° C. until bubbling occurred at 215°–220° C. The product exhibited antibacterial activity by turbidimetric assay. Found by analysis: C, 56.9; H, 5.42.

PROCEDURE 2

*Benzoyl-N'-(Morpholinomethyl)Tetracycline and Benzoyl-Tetracycline*

To a solution of 14.8 g. (0.0268 mole) N'-(morpholinomethyl)tetracycline dissolved in 50 ml. pyridine there was added dropwise 6.15 ml. benzoyl chloride at a temperature below 0° C. After removing the ice-bath, the solution was stirred for one hour and then diluted with t-butyl alcohol to precipitate 22.4 g. benzoyl-N'-(morpholinomethyl)tetracycline which was collected, dissolved in 100 ml. methanol and hydrogenated to 50 lbs. pressure and room temperature for one hour; hydrogen uptake 2 lbs.; theory 2.38 lbs. Removal of the catalyst by filtration and of the solvent by distillation in vacuo left tetracycline benzoate as an oil which was insoluble in water. This ester was then dissolved in 200 ml. chloroform, washed with 200 ml. water, carbon treated and recovered by evaporation. The ester was insoluble in methanol and water and was then converted to a yellow solid by slurrying in 100 ml. t-butyl alcohol, M.P. 89° C. with decomposition. The ester (3 g.) melted at 159°–161° C. with decomposition after slurrying in 100 ml. water and drying in vacuo over $P_2O_5$.

*Analysis.*—Calc'd. for benzoyl-tetracycline: C, 63.49; H, 5.14. Found: C, 64.7; H, 4.95.

The ester was dissolved in 40 ml. methanol by the addition of 4 drops concentrated hydrochloric acid to form the hydrochloride.

PROCEDURE 3

*Monobenzoyl-N'-(Morpholinomethyl)Tetracycline and Monobenzoyl-Tetracycline*

To a solution of 50.4 g. (0.091 mole) N'-morpholinomethyl)tetracycline dissolved in 150 ml. pyridine at −8° C. there was added dropwise 21 ml. (0.129 mole) benzoyl chloride over one hour so that the temperature did not rise above 0° C. The ice-bath was then removed and the solution stirred ten minutes and diluted with 300 ml. t-butyl alcohol. The precipitated monobenzoyl-N'-(morpholinomethyl)tetracycline, a yellow solid, was collected by filtration, slurried in 300 ml. t-butyl alcohol, again collected and dried, 55.5 g.

Monobenzoyl-N'-(morpholinomethyl)tetracycline (44 g.) was dissolved in 350 ml. water and sodium bisulfite (2 g.) was added. The solution was stirred and set up to a gel-like precipitate of monobenzoyl-tetracycline. After extraction into two 100 ml. portions of ethyl acetate, the ethyl acetate was separated, washed with water and concentrated to one-fifth volume by distillation in vacuo. The addition of 200 ml. cyclohexane precipitated monobenzoyl-tetracycline which was collected by filtration, dried in vacuo over $P_2O_5$ and found to weigh 10.2 g. and to bio-assay about 270 mcg. tetracycline hydrochloride equivalents/mgm. and to melt at 155°–157° C.

*Analysis.*—Calc'd. for monobenzoyl-tetracycline

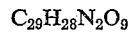

C, 63.49; H, 5.17. Found: C, 65.6; H, 5.47; residue nil; volatile loss at 110° C. over $P_2O_5$ in high vacuum for 2 hours, 6.22.

PROCEDURE 4

*O-Carbethoxy-N'-(Morpholinomethyl)Tetracycline and O-Carbethoxy-Tetracycline*

To a stirred solution of 10.9 g. (0.02 mole) of N'-(morpholinomethyl)tetracycline in 30 ml. pyridine cooled to about 0° C. there was added over 45 minutes 8 ml. (0.084 mole) ethyl chloroformate to give a very exothermic reaction. Ten ml. more pyridine was added about half-way through the addition in order to thin the reddish gel. At the end of the addition the mixture was stirred 15 minutes at 0° to −5° C. and then an hour without cooling, rising to 20° C. The mixture was then poured into t-butyl alcohol to precipitate solid O-carbethoxy-N'-(morpholinomethyl) tetracycline which was collected by filtration, washed with ether and dried in vacuo over $P_2O_5$; yield 13.7 g., M.P. on rapid heating 128°–138° C. (d., shrinks at 105° C.), soluble in methanol, ethanol and dimethylformamide and partially soluble in water, tetracycline bio-assay about 12 mcg./mgm.

Found by analysis: C, 59.5; H, 6.75; 14.5% volatiles at 110° C. over $P_2O_5$.

A solution of 8 g. (about 0.01 mole) O-carbethoxy-N'-(morpholinomethyl)tetracycline in 120 ml. methanol was hydrogenated at room temperature and 50 lbs. pressure over 8 g. (wet weight) of methanol-washed Raney nickel for three hours to give a pressure drop of 1 lb. The catalyst was then removed by filtration and the methanol by distillation in vacuo to leave O-carbethoxy-tetracycline as a dark oil. This product, upon solution in acetonitrile followed by dilution with acetone and then ether, precipitated as a pale yellow solid which was collected by filtration, washed with ether and dried in vacuo over $P_2O_5$; 3.7 g. This product was completely soluble in methanol, acetonitrile and methyl Cellosolve, partially soluble in water and acetone and insoluble in ethyl acetate, ether and methylene chloride.

To remove any residual pyridine hydrochloride, the product was finely pulverized, slurried in t-butyl alcohol, dried and found to be biologically active and to melt at 145°–153° C. (d.).

Found by analysis: C, 55.6; H, 5.09; residue less than 1.00%; $H_2O$, 4.44 at 100° C. Calculated for the tetracarbonate (tetra-O-carbethoxy) $C_{34}H_{40}N_2O_{16}$: C, 55.7; H, 5.50.

PROCEDURE 5

*O-Carbethoxy-Tetracycline*

To a stirred solution of 6 g. O-carbethoxy-N'-(morpholinomethyl)-tetracycline prepared as in Example 7 in 50 ml. water there was added a solution of 2 g. sodium bisulfite in 30 ml. water and the mixture was stirred for ten minutes, precipitating O-carbethoxy-tetracycline.

Methylene chloride (30 ml.) was added and stirring continued for 20 minutes. After separating the methylene chloride and again extracting the aqueous phase with methylene chloride, the combined solvent extracts were washed with water and the solvent was then removed by distillation to leave as the residue 1.2 g. O-carbethoxytetracycline.

PROCEDURE 6

*p-Nitrobenzoyl-N'-(Morpholinomethyl)Tetracycline and p-Nitrobenzoyl-Tetracycline*

To a solution of 20 g. (0.0368 mole) N'-(morpholinomethyl)tetracycline in 100 ml. pyridine there was added 7 g. (0.0378 mole) p-nitrobenzoyl chloride in 50 ml. pyridine. After 30 minutes the solution was poured into 250 ml. t-butyl alcohol, precipitating p-nitrobenzoyl-N'-(morpholinomethyl)tetracycline as a yellow solid which was collected by filtration and then slurried in 250 ml. water with 2 g. sodium bisulfite for thirty minutes to produce p-nitrobenzoyl-tetracycline. After extraction into two 125 ml. portions of ethyl acetate and washing the combined extracts with water, the ethyl acetate was removed by distillation in vacuo to leave p-nitrobenzoyl-tetracycline which was solidified by slurring in 300 ml. t-butyl alcohol, collected, dried and found to weigh 10 g. One gram was dissolved in 100 ml. boiling methanol and a small amount of insoluble material removed by filtration; on cooling in an ice bath 0.4 g. light tan p-nitrobenzoyl-tetracycline precipitated and was collected; M.P. 179°–180° C. (decomposition).

*Analysis.*—Calc'd. for mono-p-nitrobenzoyl-tetracycline $C_{29}H_{27}N_3O_{11}$: C, 58.68; H, 4.58. Found: C, 59.6; H, 59.3; H, 4.14, 4.06; volatile loss, 2.31% at 110 C.

A small sample of p-nitrobenzoyl-tetracycline was dissolved in a minimum amount of ethyl acetate and saturated with dry hydrogen chloride. The precipitated p-nitrobenzoyl-tetracycline hydrochloride was collected by filtration, washed with acetone, dried in vacuo and found to melt at 180° C.

*Analysis.*—Calc'd. for $C_{29}H_{28}N_3O_{11} \cdot HCl$: C, 55.3; H, 4.48. Found: C, 56.9; H, 4.44.

PROCEDURE 7

*Monobenzoyl-N'-(Dibenzylaminomethyl)Tetracycline*

To a solution of 20 g. (0.031 mole) of N'-(dibenzylaminomethyl)tetracycline in 100 ml. of pyridine was added 4.6 ml. (0.04 mole) of benzoyl chloride. The solution was stirred for 2 hours and then diluted with 900 ml. of water. A yellow solid formed which was stirred for 15 minutes and then extracted three times with 100-ml. portions of benzene. The benzene extract was evaporated under reduced pressure. The residual viscous oil was dissolved in 50 ml. of ethyl acetate and precipitated by adding 900 ml. of cyclohexane. Filtration yielded 11 g. of air-dried, solid monobenzoyl-N'-(dibenzylaminoethyl)tetracycline. The compound has a biological activity of 50 mcg./mg. and melts with decomposition over a range of 75°–115° C. For analysis a sample was dried in vacuo over phosphorus pentoxide for 1½ hours at 60° C.

*Analysis.*—Calc'd. for $C_{44}H_{43}N_3O_9$: C, 69.73; H, 5.72; N, 5.55. Found: C, 69.4; H, 5.88; N, 5.27; volatile loss, 2.8%.

The infra-red spectrum showed bands at 6.15, 6.25 and 6.35µ. The spectral data has been interpreted as evidence that the phenolic hydroxyl at C. 10 has undergone preferential esterification.

By virtue of their broad spectrum of antibacterial activity, the substituted tetracyclines thus produced by the use as intermediates of the Mannich bases of the present invention are useful as general disinfectants, as for glassware; use is thus made of these compounds as five percent aqueous solutions or suspensions.

The substituted tetracyclines thus produced by the use as intermediates of the Mannich bases of the present inventions are useful agents for the treatment of mastitis in cattle or calf scours; for this purpose use is made, for example, of suspensions in vegetable oil for installation in the teats to treat mastitis containing 1 to 100 mgm./ml. and preferably about 50 mgm., or enough capsules to provide a total dosage of 0.25 to 2.0 grams by oral administration as for calf scours.

The substituted tetracyclines thus produced by the use as intermediates of the Mannich bases of the present invention are useful agents for the preservation of freshwater and salt-water fish. Thus when dusted over the exposed surfaces of the fish, after cleaning, at the rate of 0.1 to 1000 mgm./kg. of weight of fish, the spoilage and development of odor and rancid taste in the absence of refrigeration is suppressed for many days. This is of particular importance to hunters and fishermen during warm weather. The compounds are applied as a solution or suspension in a liquid, e.g. water, or as a powder which may contain inert diluents such as talc and is applied by spraying, dipping or simple dusting.

We claim:

1. A compound selected from the group consisting of compounds of the formula

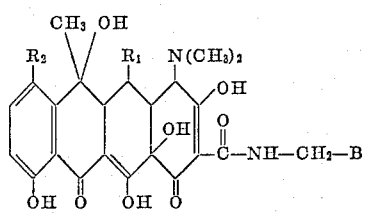

wherein $R_1$ is a member selected from the group consisting of hydrogen and hydroxyl, $R_2$ is a member selected from the group consisting of hydrogen, chloro and bromo and at least one of $R_1$ and $R_2$ is hydrogen and B represents a secondary amino group; and acid addition salts thereof.

2. A compound of the formula

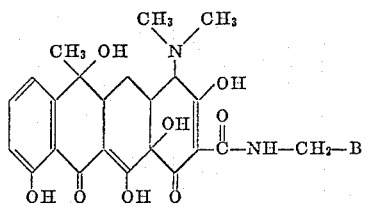

wherein B represents a secondary amino group.

3. A compound of the formula

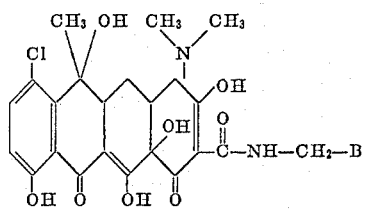

wherein B represents a secondary amino group.

4. A compound of the formula

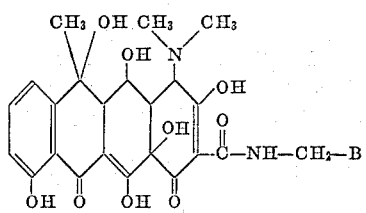

wherein B represents a secondary amino group.

5. A compound of the formula

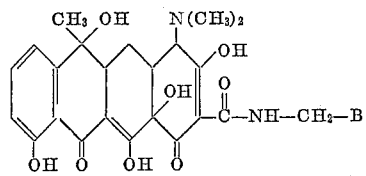

wherein B represents a secondary amino group, said secondary amino group containing in addition to its single nitrogen atom solely the elements carbon and hydrogen.

6. A compound of the formula

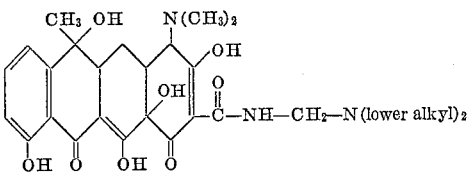

7. A compound of the formula

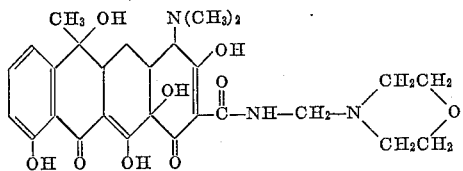

8. A compound of the formula

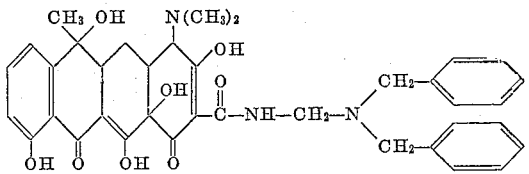

9. A compound of the formula

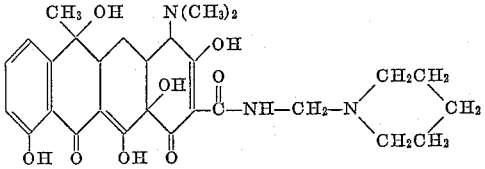

10. A compound of the formula

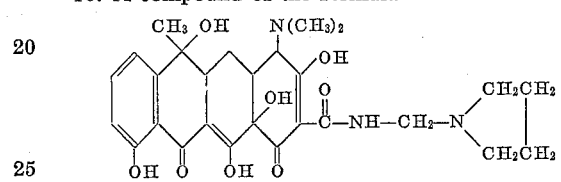

11. A compound of the formula

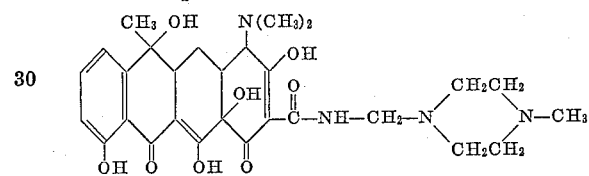

References Cited in the file of this patent
UNITED STATES PATENTS
2,997,471     Cheney et al. _____ Aug. 22, 1961